(12) United States Patent
Bovington et al.

(10) Patent No.: US 9,841,347 B2
(45) Date of Patent: Dec. 12, 2017

(54) INTEGRATED PHOTONIC-MIRROR TEST CIRCUIT

(71) Applicant: Oracle International Corporation, Redwood Shores, CA (US)

(72) Inventors: Jock T. Bovington, La Jolla, CA (US); Xuezhe Zheng, San Diego, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 194 days.

(21) Appl. No.: 14/947,061

(22) Filed: Nov. 20, 2015

(65) Prior Publication Data

US 2017/0199098 A1 Jul. 13, 2017

(51) Int. Cl.
| | |
|---|---|
| *G01B 9/00* | (2006.01) |
| *G01M 11/00* | (2006.01) |
| *G02B 6/42* | (2006.01) |
| *G02B 6/293* | (2006.01) |
| *G02B 6/26* | (2006.01) |
| *G02B 6/125* | (2006.01) |
| *G02B 6/12* | (2006.01) |

(52) U.S. Cl.
CPC .......... *G01M 11/005* (2013.01); *G02B 6/125* (2013.01); *G02B 6/26* (2013.01); *G02B 6/2938* (2013.01); *G02B 6/42* (2013.01); *G02B 2006/12104* (2013.01)

(58) Field of Classification Search
CPC ....... G01M 11/005; G02B 2006/12104; G02B 6/125; G02B 6/26; G02B 6/2938; G02B 6/42
USPC .................................................. 356/124–137
See application file for complete search history.

(56) References Cited

U.S. PATENT DOCUMENTS 5,502,782 A * 3/1996 Smith ................ G02B 6/02071
385/1

\* cited by examiner

*Primary Examiner* — Tri T Ton
(74) *Attorney, Agent, or Firm* — Park, Vaughan, Fleming & Dowler LLP

(57) ABSTRACT

A reflectivity test circuit is described. The reflectivity test circuit includes a symmetric structure that cancels errors in the reflectivity measurements. In particular, the reflectivity test circuit includes an optical waveguide that is optically coupled to two optical ports and two optical couplers. The optical couplers are optically coupled to adjacent optical waveguides, at least one of which is optically coupled to a third optical port and the mirror. Moreover, a length of the optical waveguide is chosen to match the round-trip optical path length in at least the one of the adjacent optical waveguides. During operation, control logic determines the reflectivity of the mirror based at least on a ratio of an optical power measured on one of the two optical ports to an input optical power on the third optical port.

12 Claims, 9 Drawing Sheets

INTEGRATED PHOTONIC-MIRROR TEST CIRCUIT

GOVERNMENT LICENSE RIGHTS

This invention was made with U.S. Government support under Agreement No. HR0011-08-9-0001 awarded by DARPA. The U.S. Government has certain rights in the invention.

BACKGROUND

Field

The present disclosure relates to techniques for testing optical components. More specifically, the present disclosure relates to an integrated test circuit for determining reflectivity of a mirror.

Related Art

Silicon photonics is a promising technology that can provide large communication bandwidth, large density, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, high-speed CMOS optical-waveguide photo-detectors and optical sources (such as lasers).

Many of these components, such as lasers, include an integrated mirror. However, these mirrors are often very sensitive to fabrication variation that can adversely affect performance of the components. It is often difficult to accurately measure the reflectivity of integrated mirrors. Moreover, in the absence of accurate reflectivity measurements, parasitic reflective elements in photonic integrated circuits cannot be appropriately quantified without accurate characterization of their reflectivity, and therefore cannot be reduced by iterative design, fabrication, and validation cycles.

Hence, what is needed is a test structure for measuring the reflectivity of integrated mirrors without the above-described problems.

SUMMARY

One embodiment of the present disclosure provides an integrated circuit that includes a reflectivity test circuit. The reflectivity test circuit includes: a first mirror; a first optical port that, during operation, selectively receives first input optical power; and a first optical waveguide having a first end optically coupled to the first mirror and a second end optically coupled to the first optical port. Moreover, the reflectivity test circuit includes: a first optical coupler; a first photodetector that, during operation, measures a first optical power; a second photodetector that, during operation, measures a second optical power; and a second optical waveguide optically coupled to the first optical waveguide by the first optical coupler, where a first end of the second optical waveguide is optically coupled to the first photodetector and a second end of the second optical waveguide is optically coupled to the second photodetector. Furthermore, the reflectivity test circuit includes control logic electrically coupled to the first photodetector and the second photodetector. During operation, the control logic determines a reflectivity of the first mirror based on a first ratio of the first optical power and the second optical power when the first input optical power is received on the first optical port.

Note that the first optical port may include a vertical grating coupler.

In some embodiments, the integrated circuit includes: a substrate; a buried-oxide layer disposed on the substrate; and a semiconductor layer disposed on the buried-oxide layer. The first optical waveguide, the first optical coupler and the second optical waveguide may, at least in part, be included in the semiconductor layer.

Moreover, the first optical waveguide may have a first length equal to L and the second optical waveguide has a second length equal to 2·L.

Furthermore, during operation, the control logic may determine the reflectivity at different wavelengths.

Additionally, the first mirror may include a distributed Bragg reflector.

In some embodiments, the reflectivity test circuit includes: a second optical coupler; a first optical waveguide termination; a second optical waveguide termination; and a third optical waveguide optically coupled to the second optical waveguide by the second optical coupler. A first end of the third optical waveguide may be optically coupled to the first optical waveguide termination and a second end of the third optical waveguide may be optically coupled to the second optical waveguide termination.

Furthermore, the reflectivity test circuit may include: a second optical coupler; a second mirror; a second optical port that, during operation, selectively receives second input optical power; and a third optical waveguide optically coupled to the second optical waveguide by the second optical coupler. A first end of the third optical waveguide may be optically coupled to the second mirror and a second end of the third optical waveguide may be optically coupled to the second optical port. During operation, the control logic may determine the reflectivity of the first mirror based on a product of the first ratio and a second ratio of the second optical power and the first optical power when the second input optical power is received on the second optical port.

Note that the second optical port may include a vertical grating coupler. Moreover, the third optical waveguide may have a third length equal to L and/or the second mirror may include a distributed Bragg reflector.

Another embodiment provides an integrated circuit that includes a reflectivity test circuit. The reflectivity test circuit includes: a first mirror; a first photodetector that, during operation, measures a first optical power; and a first optical waveguide having a first end optically coupled to the first mirror and a second end optically coupled to the first photodetector. Moreover, the reflectivity test circuit includes: a first optical coupler; a first optical port that, during operation, selectively receives first input optical power; a second optical port that, during operation, selectively receives second input optical power; and a second optical waveguide optically coupled to the first optical waveguide by the first optical coupler, where a first end of the second optical waveguide is optically coupled to the first optical port and a second end of the second optical waveguide is optically coupled to the second optical port. Furthermore, the reflectivity test circuit includes: a second optical coupler; a second mirror; a second photodetector that, during operation, measures a second optical power; and a third optical waveguide optically coupled to the second optical waveguide by the second optical coupler, where a first end of the third optical waveguide is optically coupled to the second mirror and a second end of the third optical waveguide is optically coupled to the second photodetector.

Additionally, the reflectivity test circuit includes control logic electrically coupled to the first photodetector and the second photodetector. During operation, the control logic determines a reflectivity of the first mirror based on a first ratio of the first optical power and the second optical power when the first input optical power is received on the first optical port.

In some embodiments, the control logic determines the reflectivity of the first mirror based on a product of the first ratio and a second ratio of the second optical power and the first optical power when the second input optical power is received on the second optical port.

Another embodiment provides a system that includes the integrated circuit.

Another embodiment provides a method for determining the reflectivity of the first mirror using one of the embodiments of the reflectivity test circuit.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a reflectivity test circuit, an integrated circuit that includes the reflectivity test circuit and a technique for determining the reflectivity of a mirror are described. The reflectivity test circuit includes a symmetric structure that cancels errors in the reflectivity measurements. In particular, the reflectivity test circuit includes an optical waveguide that is optically coupled to two optical ports and two optical couplers. The optical couplers are optically coupled to adjacent optical waveguides, at least one of which is optically coupled to a third optical port and the mirror. Moreover, a length of the optical waveguide is chosen to match the round-trip optical path length in at least the one of the adjacent optical waveguides. During operation, control logic determines the reflectivity of the mirror based at least on a ratio of an optical power measured on one of the two optical ports to an input optical power on the third optical port.

By correcting for errors in the reflectivity measurements, this optical characterization technique may significantly reduce the error and thus the accuracy of the reflectivity measurements for the mirror. This improved characterization may allow mirrors (such as laser mirrors) to be validated prior to packaging, and may allow systematic improvements in the design and fabrication of mirrors. Therefore, the optical characterization technique may improve the performance of the mirrors and systems that include the mirrors. In turn, the improved performance may increase the yield and reduce the cost of the mirrors and the systems. Consequently, the optical characterization technique may facilitate high-speed inter- and intra-chip silicon-photonic interconnects, as well as associated systems (such as high-performance computing systems).

In the discussion that follows, mirrors (and, in particular, distributed Bragg reflectors) are used as an illustration of silicon-photonic optical components that can be characterized using the reflectivity test circuit. However, the optical characterization technique may be used to measure the reflectivity of a wide variety of silicon-photonic optical components.

Figure 1:
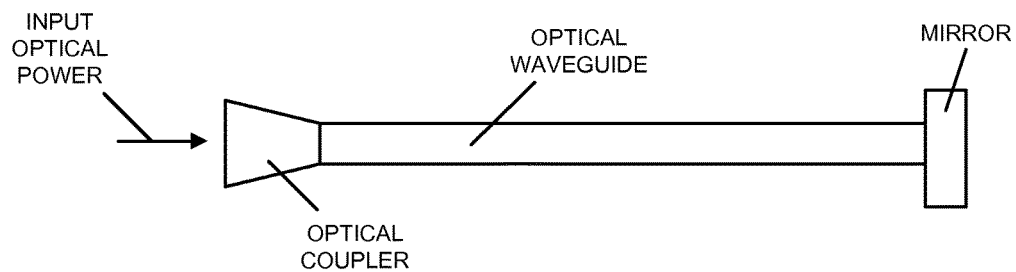
FIG. 1 is a drawing illustrating an existing technique for measuring the reflectivity of a mirror.

We now describe embodiments of the reflectivity test circuit. FIG. 1 presents a drawing illustrating an existing technique for measuring the reflectivity of a mirror. This existing technique, which is based on a coupled optical waveguide, is often prone to error because it relies on knowledge of the input optical power as well as the individual loss factors from the test setup, the optical coupler, and the optical waveguide that separates the optical coupler and the reflective element (such as a reflector or a mirror).

Figure 2:
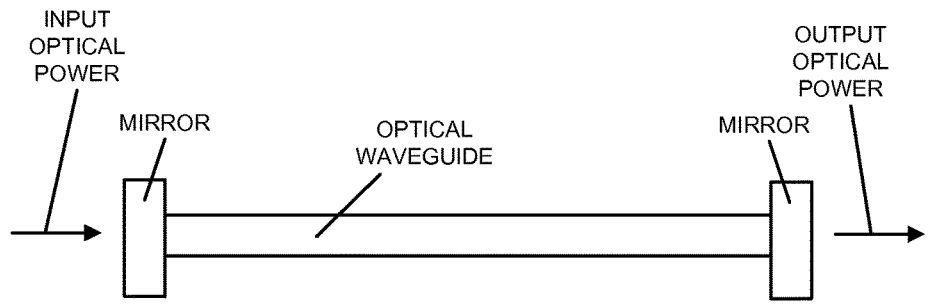
FIG. 2 is a drawing illustrating an existing technique for measuring the reflectivity of a mirror.

Moreover, as shown in FIG. 2, which presents a drawing illustrating an existing technique for measuring the reflectivity of a mirror, an optical cavity that includes two reflectors or mirrors may be used to determine the mirror reflectivity if the optical waveguide loss is known. However, this existing technique may only be valid for broad-band reflectors because it assumes a constant reflectivity within a full free-spectral range of the optical cavity. Furthermore, the existing technique illustrated in FIG. 2 typically requires that transmission through the reflectors is possible, which is not the case for many high-reflectivity mirror designs.

Figure 3:
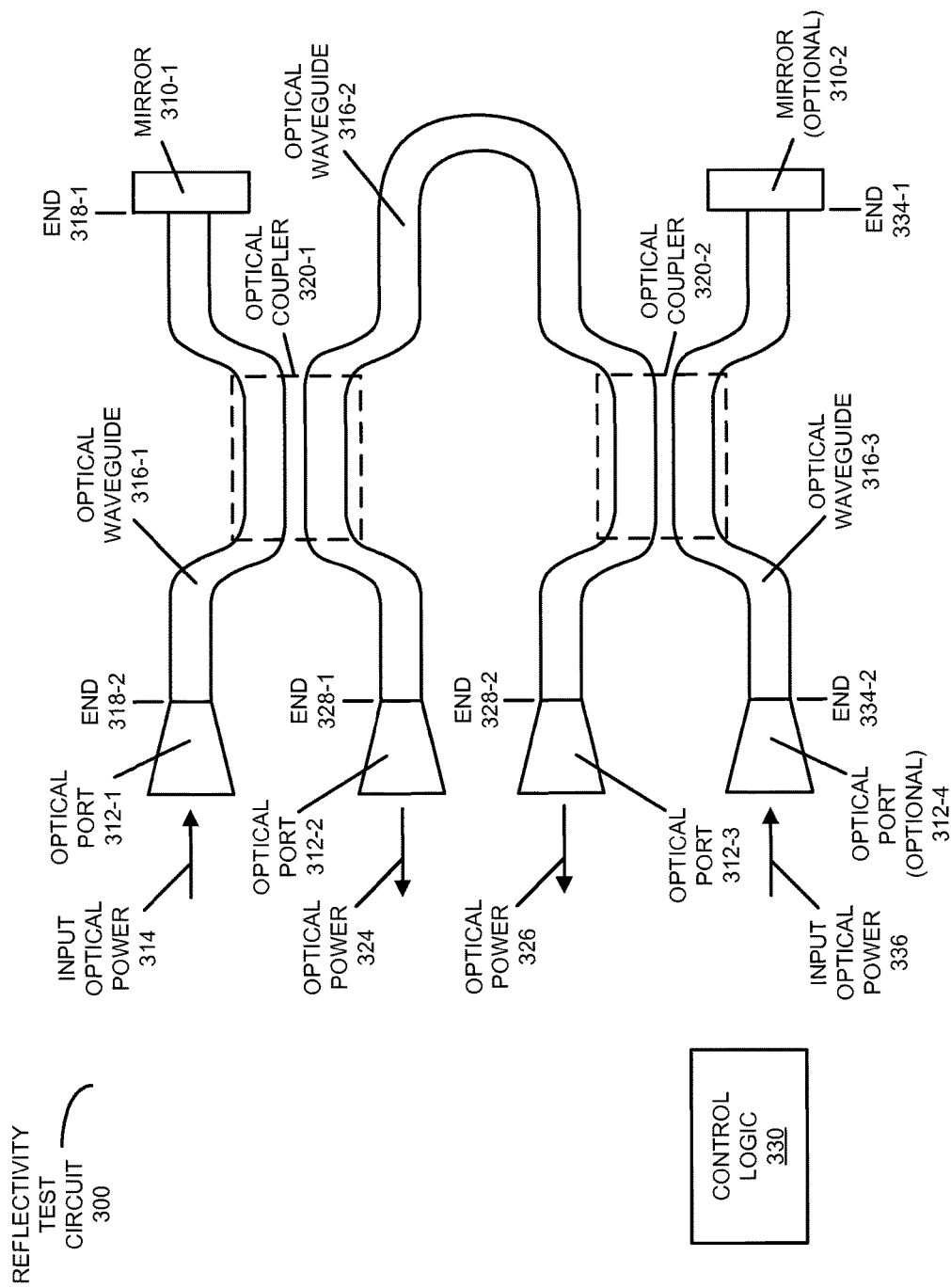
FIG. 3 is a block diagram illustrating a reflectivity test circuit in accordance with an embodiment of the present disclosure.

These challenges are addressed by the reflectivity test circuit. FIG. 3 presents a block diagram illustrating a reflectivity test circuit 300. This reflectivity test circuit includes: a mirror 310-1 (and, more generally, an optical component having a non-zero reflectivity); an optical port 312-1 that, during operation of reflectivity test circuit 300, selectively receives input optical power 314; and an optical waveguide 316-1 having an end 318-1 optically coupled to mirror 310-1 and an end 318-2 optically coupled to optical port 312-1. Moreover, reflectivity test circuit 300 includes: an optical coupler 320-1; optical ports 312-2 and 312-3; an optical waveguide 316-2 optically coupled to optical waveguide 316-1 by optical coupler 320-1, where optical waveguide 316-2 has an end 328-1 optically coupled to optical port 312-2 and an end 328-2 optically coupled to optical port 312-3. Furthermore, reflectivity test circuit 300 includes an optical coupler 320-2; an optional mirror 310-2; an optional optical port 312-4 that, during operation of reflectivity test circuit 300, may selectively receive input optical power 336; an optical waveguide 316-3 optically coupled to optical waveguide 316-2 by optical coupler 320-2, where optical waveguide 316-3 has an end 334-1 optically coupled to optional mirror 310-2 and an end 334-2 optically coupled to optional optical port 312-4.

Additionally, reflectivity test circuit 300 includes control logic 330 that may be electrically coupled to photodetectors (not shown). During operation of reflectivity test circuit 300, an optical power 324 may be measured using a photodetector (such as photodetector 322-1 in FIG. 4) at optical port 312-2 when input optical power 314 is received at optical port 312-1, and an optical power 326 may be measured using a photodetector (such as photodetector 322-2 in FIG. 4) at optical port 312-3 when input optical power 336 is received at optional optical port 312-4. Then, control logic 330 may determine a reflectivity of mirror 310-1 based on a first ratio of optical power 324 and optical power 326 when input optical power 314 is received on optical port 312-1. Alternatively, control logic 330 may determine a reflectivity of optional mirror 310-2 based on a second ratio of optical power 326 and optical power 324 when input optical power 336 is received on optional optical port 312-4. In some embodiments, control logic 330 determines the reflectivity of mirror 310-1 or mirror 310-2 based on a product of the first ratio and the second ratio. Note that control logic 330 may determine the reflectivity at different wavelengths, e.g., using measurements at input optical power 314 or 336 at the different wavelengths.

Moreover, optical waveguides 316-1 and/or 316-3 may have a length equal to L and optical waveguide 316-2 may have a second length equal to 2·L. In an exemplary embodiment, one or more of mirrors 310 include a distributed Bragg reflector, one or more of optical couplers 320 include a directional coupler, and/or one or more of optical ports 312 include a vertical grating coupler (which may enable wafer-scale testing without integrated lasers or another optical source(s), or without integrated photodetectors).

By using a fully symmetric reflective test circuit, errors in the reflectivity measurement may be cancelled out. In particular, referring back to FIG. 3, reflectivity test circuit 300 may include two mirrors 310 (or reflective elements) integrated with two optical couplers 320 that are optically coupled by optical waveguide 316-2 having a length of 2·L, which is chosen to match the round-trip path length of optical waveguides 316-1 and 316-3 (which have an identical design) optically coupling optical couplers 320 and mirrors 310.

During the optical characterization technique, the reflectivity test circuit is used to determine the product of two measurements of ratios of optical power on optical ports 312-2 and 312-3 when a tunable optical signal is input into optical port 312-1 and then optical port 312-4. In particular, when input optical power 314 is received on optical port 312-1, optical powers 324 ($P_2'$) and 326 ($P_3'$) may be measured using photodetectors. Then, when input optical power 336 is received on optical port 312-4, optical powers 324 ($P_2''$) and 326 ($P_3''$) may be measured using photodetectors.

When the optical powers measured at each photodetector are divided, the dependence on the input optical power and any subsequent loss leading up to the optical coupler is removed. The resulting ratio includes the loss terms of optical couplers 320 to the photodetectors at optical ports 312-2 and 312-3 ($\alpha_{c2}$, and $\alpha_{c3}$), the loss terms through optical couplers 320 ($\alpha_{Y1}$, and $\alpha_{Y2}$), and the loss because of cross coupling ($\alpha_{X1}$, and $\alpha_{X2}$). Furthermore, the additional optical waveguide loss between input ports and output ports is represented as $\alpha_{WG2 \leftrightarrow 1}$, $\alpha_{WG4 \leftrightarrow 3}$, $\alpha_{WG4 \leftrightarrow 2}$ and $\alpha_{WG3 \leftrightarrow 1}$. As shown below, as long as optical waveguides 316 have the same loss and mirrors 310 are the same, the reflectivity R can be determined by the product of the two ratios. In particular, $$R = \frac{\alpha_{c2} \cdot \alpha_{Y1} \cdot \alpha_{X1} \cdot \alpha_{WG2 \leftrightarrow 1}}{\alpha_{c3} \cdot \alpha_{X1} \cdot \alpha_{Y2} \cdot \alpha_{WG3 \leftrightarrow 1}} = \frac{P_2'}{P_3'} = \frac{P_2 \cdot \alpha_{c2} \cdot \alpha_{Y1} \cdot \alpha_{X1} \cdot \alpha_{WG2 \leftrightarrow 1}}{P_3 \cdot \alpha_{c3} \cdot \alpha_{X1} \cdot \alpha_{Y2} \cdot \alpha_{WG3 \leftrightarrow 1}},$$

$$R = \frac{\alpha_{c3} \cdot \alpha_{Y2} \cdot \alpha_{X2} \cdot \alpha_{WG4 \leftrightarrow 3}}{\alpha_{c2} \cdot \alpha_{X2} \cdot \alpha_{Y1} \cdot \alpha_{WG4 \leftrightarrow 2}} = \frac{P_3''}{P_2''} = \frac{P_3 \cdot \alpha_{c3} \cdot \alpha_{Y2} \cdot \alpha_{X2} \cdot \alpha_{WG4 \leftrightarrow 3}}{P_2 \cdot \alpha_{c2} \cdot \alpha_{X2} \cdot \alpha_{Y1} \cdot \alpha_{WG4 \leftrightarrow 2}},$$

$$R^2 = \frac{\alpha_{c2} \cdot \alpha_{Y1} \cdot \alpha_{X1} \cdot \alpha_{WG2 \leftrightarrow 1}}{\alpha_{c3} \cdot \alpha_{X1} \cdot \alpha_{Y2} \cdot \alpha_{WG3 \leftrightarrow 1}} \cdot \frac{\alpha_{c3} \cdot \alpha_{Y2} \cdot \alpha_{X2} \cdot \alpha_{WG4 \leftrightarrow 3}}{\alpha_{c2} \cdot \alpha_{X2} \cdot \alpha_{Y1} \cdot \alpha_{WG4 \leftrightarrow 2}},$$

$$R^2 = \frac{\alpha_{WG2 \leftrightarrow 1} \cdot \alpha_{WG4 \leftrightarrow 3}}{\alpha_{WG3 \leftrightarrow 1} \cdot \alpha_{WG4 \leftrightarrow 2}} = \frac{P_2'}{P_3'} \cdot \frac{P_3''}{P_2''}, \text{ and}$$

$$R = \sqrt{\frac{P_2'}{P_3'} \cdot \frac{P_3''}{P_2''}}.$$

(Note that by taking the product of the ratios, the error terms in the reflectivity measurement cancel out.)

Alternatively (and equivalently), the reflectivity can be determined based on the product of ratios when the input power is applied to optical port 312-2 and the optical powers are measured at optical ports 312-1 ($P_1'$) and 312-4 ($P_4'$), and when the input power is applied to optical port 312-3 and the optical powers are measured at optical ports 312-1 ($P_1''$) and 312-4 ($P_4''$), In particular, $$R^2 = \frac{\alpha_{WG4 \leftrightarrow 3} \cdot \alpha_{WG1 \leftrightarrow 3}}{\alpha_{WG4 \leftrightarrow 2} \cdot \alpha_{WG2 \leftrightarrow 1}} = \frac{P_1'}{P_4'} \cdot \frac{P_4''}{P_1''}, \text{ and}$$

$$R = \sqrt{\frac{P_1'}{P_4'} \cdot \frac{P_4''}{P_1''}}.$$

Note that the reflectivity can be determined for highly wavelength-dependent mirrors such as distributed Bragg reflectors by measuring the optical powers as a function of the wavelength. In these embodiments, some frequency offset between the two measurements may be needed for very wavelength-selective structures in order to align the two measurements to account for subtle variations in the mirrors 310.

Figure 4:
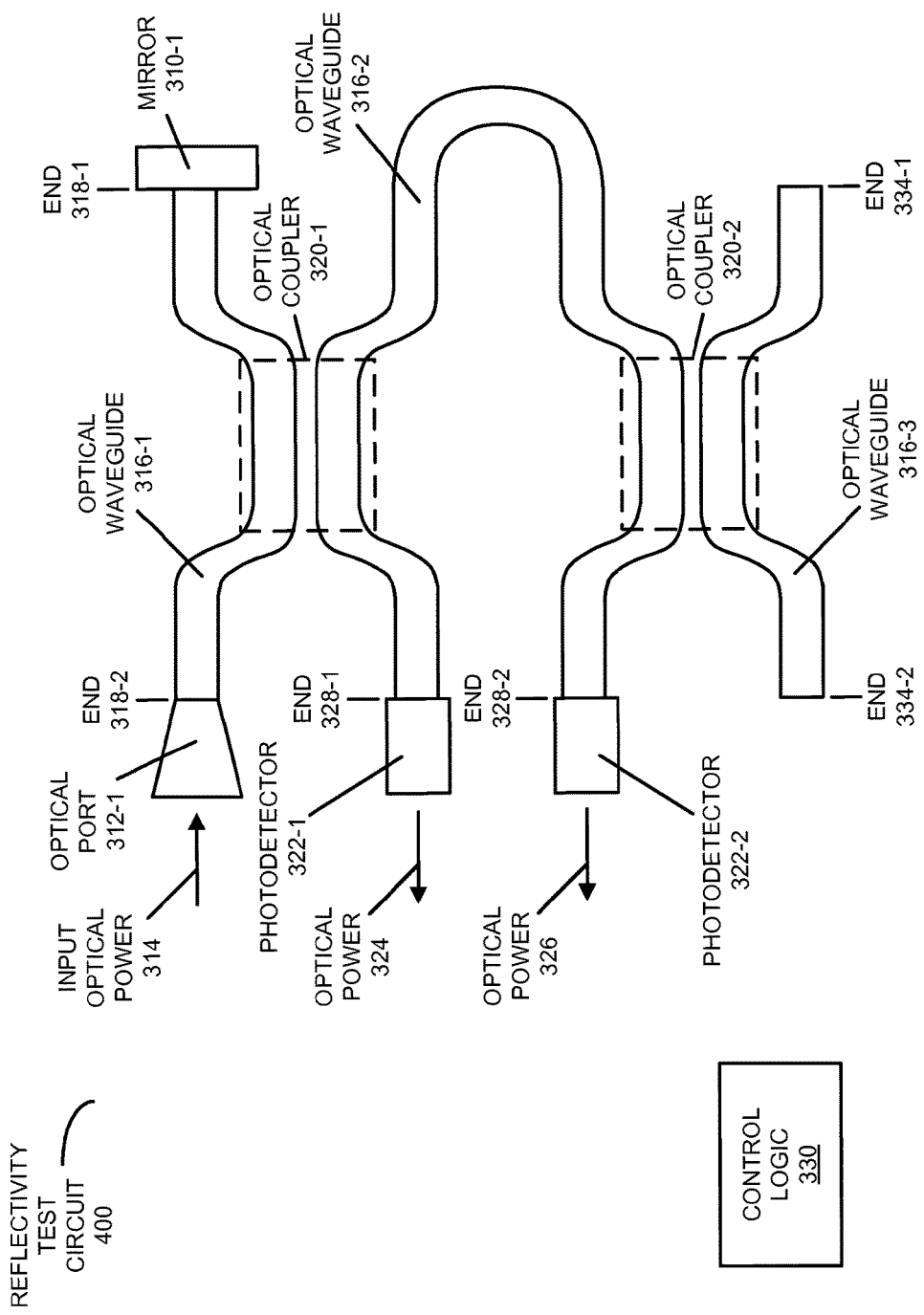
FIG. 4 is a block diagram illustrating a reflectivity test circuit in accordance with an embodiment of the present disclosure.

As described previously, optical powers may be measured using photodetectors. In some embodiments, the photodetectors are included in the reflectivity test circuit. This is shown in FIG. 4, which presents a block diagram illustrating a reflectivity test circuit 400 that includes photodetectors 322. In some embodiments, the reflectivity test circuit includes one or more optical sources.

In addition, as shown in FIG. 4, if optical couplers 320 are nearly identical and photodetectors 322 are integrated with consistent coupling loss without significant back reflection, a single ratio (such as the first ratio) with a single input optical power may be sufficient to determine the reflectivity. In particular, $$R \approx \frac{P_2}{P_3}.$$

(Thus, the reflectivity may be determined using one ratio, another ratio and/or both ratios.)

Figure 5:
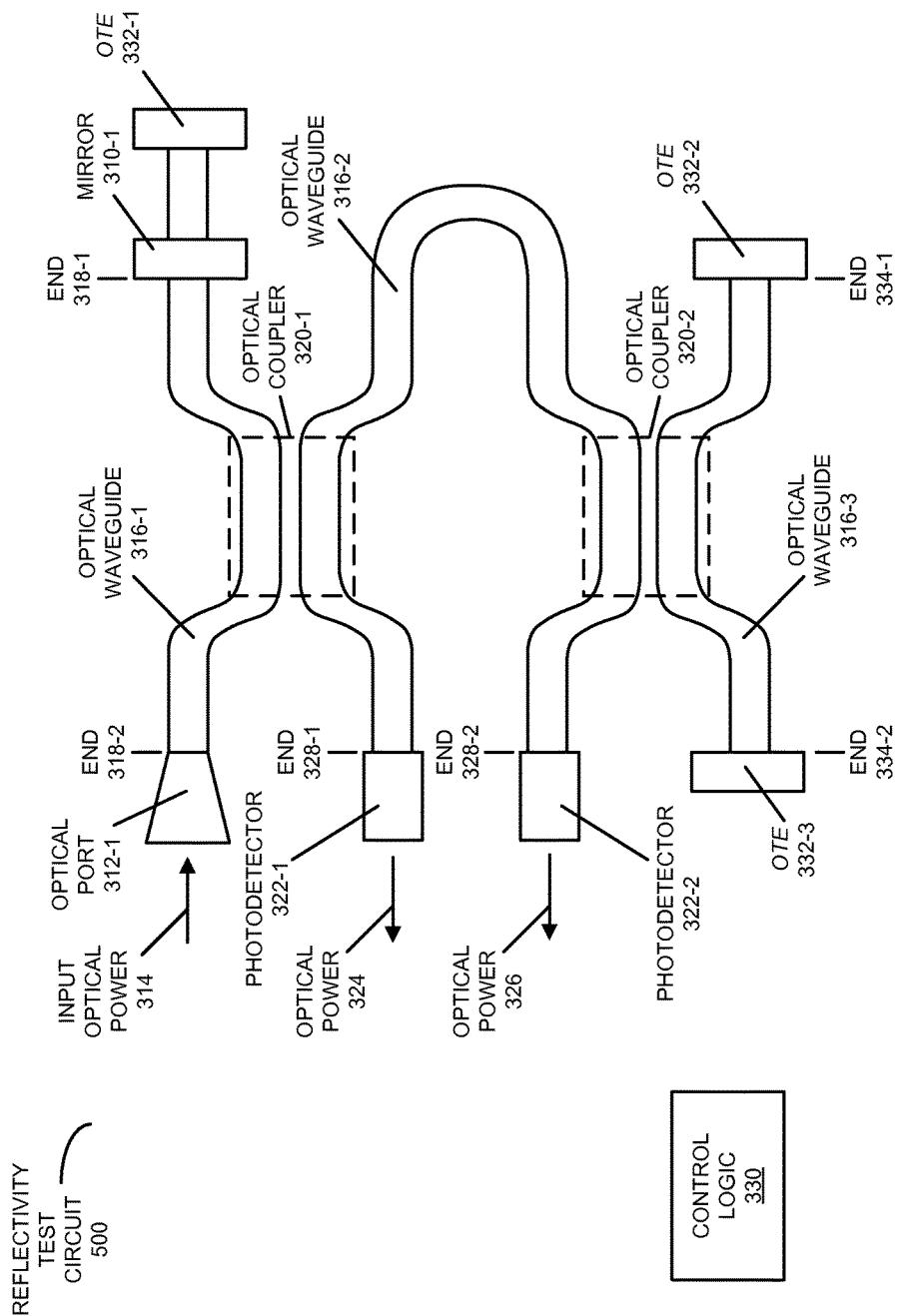
FIG. 5 is a block diagram illustrating a reflectivity test circuit in accordance with an embodiment of the present disclosure.

Moreover, in some embodiments non-reflective optical termination elements are included in the reflectivity test circuit to terminate optical waveguide(s) 316 to spurious coupled cavities that can disrupt the spectral integrity of the optical signal propagating in optical waveguide(s) 316. This is shown in FIG. 5, which presents a block diagram illustrating a reflectivity test circuit 500 that includes one or more optical termination elements (OTE) 332. In an exemplary embodiment, optical termination elements 332 flare light into slab modes that are anti-reflective (such as by using an optical waveguide taper and/or a material with high absorption).

Figure 6:
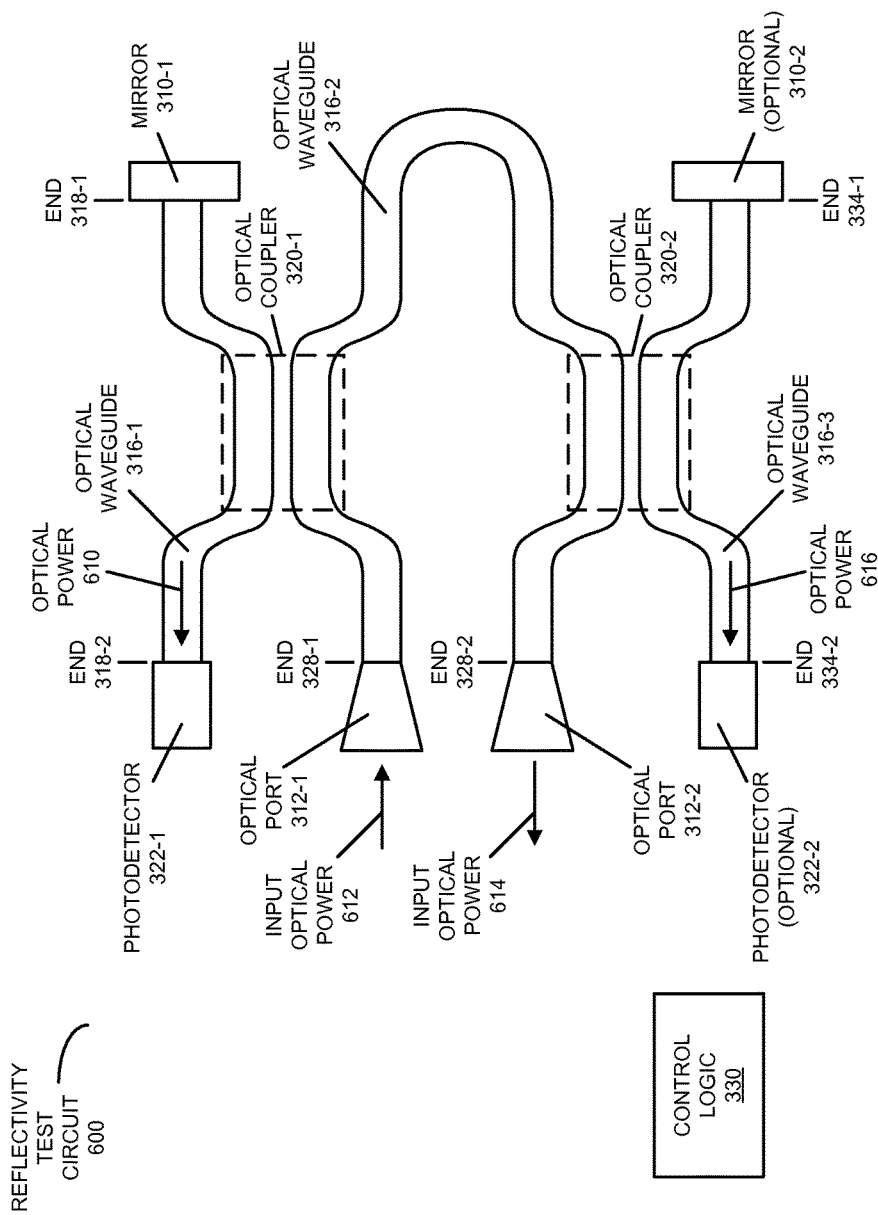
FIG. 6 is a block diagram illustrating a reflectivity test circuit in accordance with an embodiment of the present disclosure.

While the preceding embodiments illustrate a particular symmetric configuration of the reflectivity test circuit, other symmetric configurations may be used. This is shown in FIG. 6, which presents a block diagram illustrating a reflectivity test circuit 600. In particular, reflectivity test circuit 600 may include: mirror 310-1; photodetector 322-1 that, during operation, measures optical power 610; and optical waveguide 316-1 having end 318-1 optically coupled to mirror 310-1 and end 318-2 optically coupled to photodetector 322-1. Moreover, reflectivity test circuit 600 includes: optical coupler 320-1; optical port 312-1 that, during operation, selectively receives input optical power 612; optical port 312-2 that, during operation, selectively receives input optical power 614; and optical waveguide 316-2 optically coupled to optical waveguide 316-1 by optical coupler 320-1, where end 328-1 of optical waveguide 316-2 is optically coupled to optical port 312-1 and end 328-2 of optical waveguide 316-1 is optically coupled to optical port 312-2.

Furthermore, reflectivity test circuit 600 includes: optical coupler 320-2; optional mirror 310-2; optional photodetector 322-2 that, during operation, measures optical power 616; and optical waveguide 316-3 optically coupled to optical waveguide 316-2 by optical coupler 320-2, where end 334-1 of optical waveguide 316-3 is optically coupled to optional mirror 310-2 and end 334-2 of optical waveguide 316-3 is optically coupled to optional photodetector 322-2.

Additionally, reflectivity test circuit 600 includes control logic 330 electrically coupled to photodetector 322-1 and optional photodetector 322-2. During operation, control logic 330 determines a reflectivity of mirror 310-1 based on a third ratio of optical power 610 and optical power 616 when input optical power 612 is received on optical port 312-1.

In some embodiments, control logic 330 determines the reflectivity of mirror 310-1 based on a product of the third ratio and a fourth ratio of optical power 610 and optical power 616 when input optical power 614 is received on optical port 312-2.

The reflectivity test circuit and the optical characterization technique allow the reflectivity of a mirror to be measured as a function of wavelength for wavelength-selective mirrors with high or low reflectivity, and/or with sharp changes in the reflectivity with wavelength. Moreover, the optical characterization technique can be used with optical components or devices that have negligible transmission (i.e., a reflectivity near 100%) without the additional uncertainty associated with existing measurement techniques.

Figure 7:
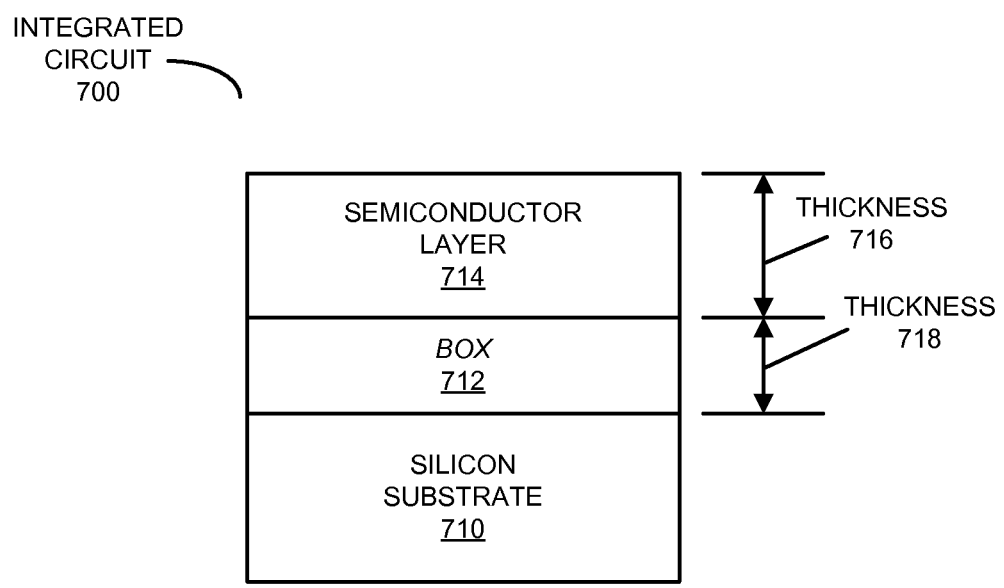
FIG. 7 is a block diagram illustrating an integrated circuit in accordance with an embodiment of the present disclosure.

The reflectivity test circuit may be implemented on an integrated circuit, such as a photonic integrated circuit. FIG. 7 presents a block diagram illustrating an integrated circuit 700. This integrated circuit includes: a substrate 710, a buried-oxide (BOX) layer 712 disposed on substrate 710, and a semiconductor layer 714 disposed on buried-oxide layer 712. Optical components in the reflectivity test circuit may, at least in part, be included in semiconductor layer 714. In an exemplary embodiment, substrate 710 and semiconductor layer 714 include silicon and buried-oxide layer 712 includes silicon dioxide. Thus, substrate 710, buried-oxide layer 712 and semiconductor layer 714 may constitute a silicon-on-insulator technology.

Moreover, semiconductor layer 714 may have a thickness 716 that is less than 1 μm (such as 0.3-1 μm) or more than 3 μm. Furthermore, buried-oxide layer 712 may have a thickness 718 between 0.3 and 3 μm (such as 0.8 μm). Note that a width of the optical waveguides may be 450-500 nm.

Figure 8:
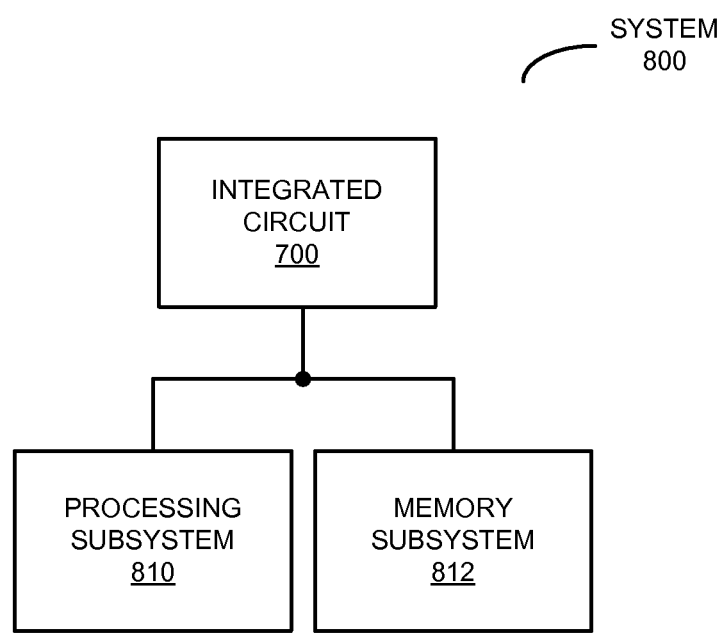
FIG. 8 is a block diagram illustrating a system that includes the integrated circuit of FIG. 7 in accordance with an embodiment of the present disclosure.

Integrated circuit 700 may be included in a system and/or an electronic device. This is shown in FIG. 8, which presents a block diagram illustrating a system 800. In some embodiments, system 800 includes processing subsystem 810 (with one or more processors) and memory subsystem 812 (with memory).

In general, functions of the integrated circuit and system 800 may be implemented in hardware and/or in software. Thus, system 800 may include one or more program modules or sets of instructions stored in an optional memory subsystem 812 (such as DRAM or another type of volatile or non-volatile computer-readable memory), which may be executed by an optional processing subsystem 810. Note that the one or more computer programs may constitute a computer-program mechanism. Furthermore, instructions in the various modules in optional memory subsystem 812 may be implemented in: a high-level procedural language, an object-oriented programming language, and/or in an assembly or machine language. Note that the programming language may be compiled or interpreted, e.g., configurable or configured, to be executed by the processing subsystem.

Components in system 800 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 800 may be at one location or may be distributed over multiple, geographically dispersed locations.

System 800 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, the integrated circuit can be used in a wide variety of applications, such as: optical communications (for example, in a transceiver, an optical interconnect or an optical link), a radio-frequency filter, a bio-sensor, data storage (such as an optical-storage device or system), medicine (such as a diagnostic technique or surgery), a barcode scanner, and/or metrology (such as precision measurements of distance).

Furthermore, the embodiments of the reflectivity test circuit, integrated circuit 700 and/or system 800 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the reflectivity test circuit, integrated circuit 700 and/or system 800 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the optical characterization technique may be used with other materials, as is known to one of skill in the art. Furthermore, these materials and compounds may be fabricated using a wide variety of processing techniques, including: evaporation, sputtering, molecular-beam epitaxy, wet or dry etching (such as photolithography or direct-write lithography), polishing, etc.

Figure 9:
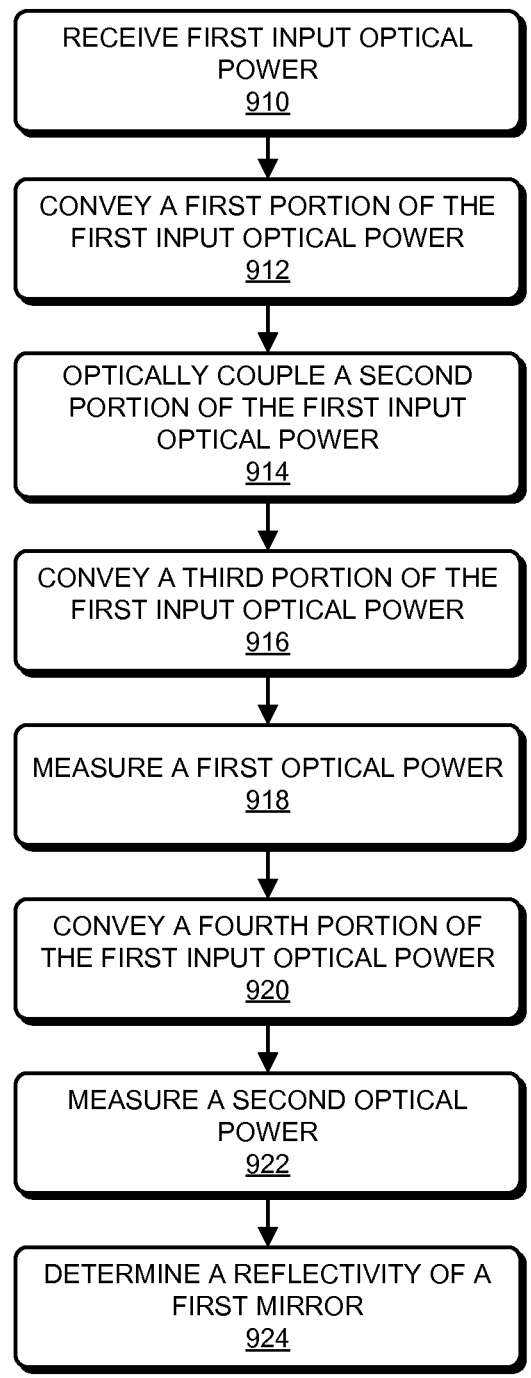
FIG. 9 is a flow chart illustrating a method for determining the reflectivity of a first mirror in accordance with an embodiment of the present disclosure.

We now describe embodiments of a method. FIG. 9 presents a flow chart illustrating a method 900 for determining the reflectivity of a first mirror, which may be performed by one of the embodiments of the reflectivity test circuit. During operation, the reflectivity test circuit receives first input optical power (operation 910) at a first optical port, and conveys a first portion of the first input optical power (operation 912) to the first mirror using a first optical waveguide. Then, the reflectivity test circuit optically couples a second portion of the first input optical power (operation 914) to a second optical waveguide using a first optical coupler, and conveys a third portion of the first input optical power (operation 916) to a first photodetector using the second optical waveguide.

Moreover, the reflectivity test circuit measures a first optical power (operation 918) using the first photodetector, and conveys a fourth portion of the first input optical power (operation 920) to a second photodetector using the second optical waveguide. Furthermore, the reflectivity test circuit measures a second optical power (operation 922) using the second photodetector.

Additionally, the reflectivity test circuit determines the reflectivity of the first mirror (operation 924) based on a first ratio of the first optical power and the second optical power, where the first optical waveguide has a first length equal to L, the second optical waveguide has a second length equal to 2·L, and the third optical waveguide has a third length equal to L.

Figure 10:
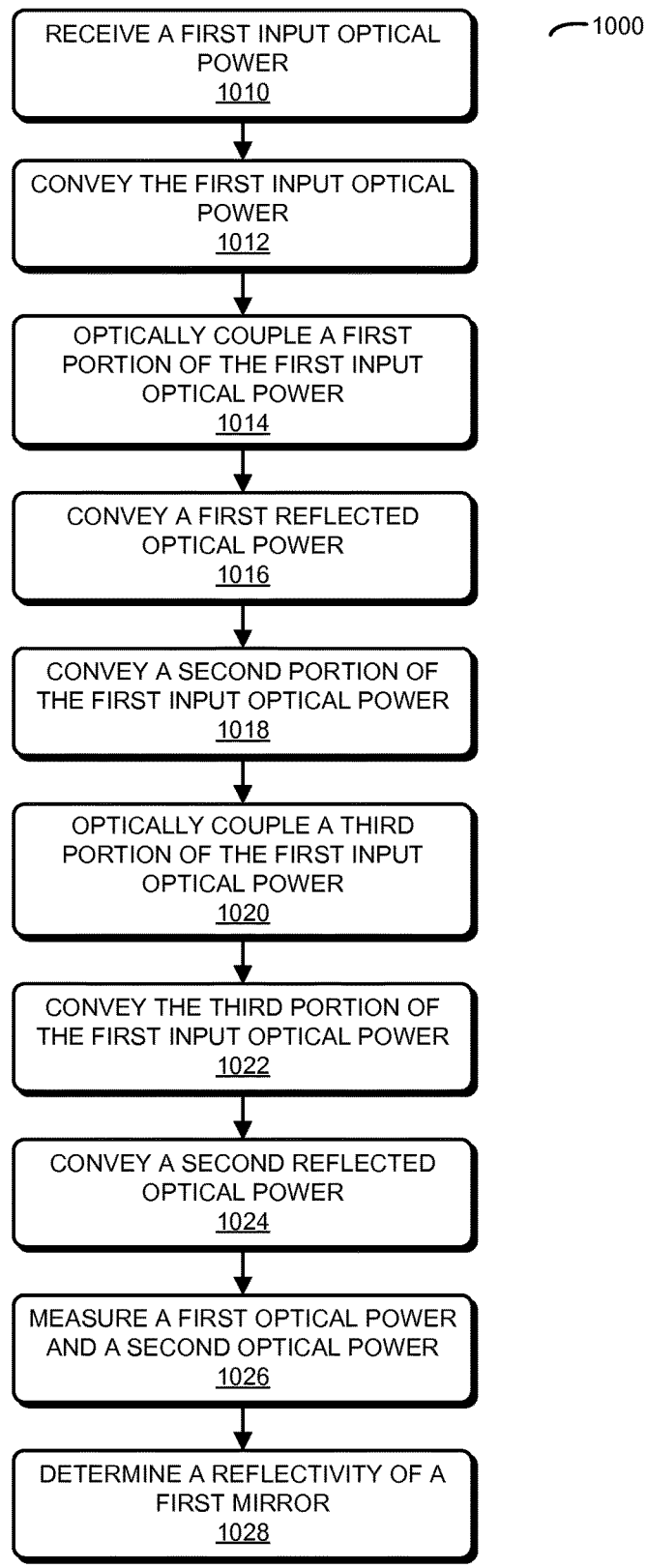
FIG. 10 is a flow chart illustrating a method for determining the reflectivity of a first mirror in accordance with an embodiment of the present disclosure.

FIG. 10 presents a flow chart illustrating a method 1000 for determining the reflectivity of a first mirror, which may be performed by one of the embodiments of the reflectivity test circuit. During operation, the reflectivity test circuit receives first input optical power (operation 1010) at a first optical port, and conveys the first input optical power (operation 1012) to a first optical coupler using a first optical waveguide. Then, the reflectivity test circuit optically couples a first portion of the first input optical power (operation 1014) to the first mirror using a second optical waveguide, and conveys a first reflected optical power (operation 1016) to a first photodetector using the second optical waveguide.

Moreover, the reflectivity test circuit conveys a second portion of the first input optical power (operation 1018) to a second optical coupler using the first optical waveguide, and optically couples a third portion of the first input optical power (operation 1020) to a third optical waveguide. Furthermore, the reflectivity test circuit conveys the third portion of the first input optical power (operation 1022) to a second mirror using the third optical waveguide, and conveys a second reflected optical power (operation 1024) to a second photodetector using the third optical waveguide.

Additionally, the reflectivity test circuit measures a first optical power (operation 1026) using the first photodetector, and measures a second optical power (operation 1026) using the second photodetector.

The reflectivity test circuit determines the reflectivity of the first mirror (operation 1028) based on a first ratio of the first optical power and the second optical power, where the first optical waveguide has a first length equal to L, the second optical waveguide has a second length equal to 2·L, and the third optical waveguide has a third length equal to L.

In some embodiments of methods 900 and/or 1000, there may be additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising a reflectivity test circuit, wherein the reflectivity test circuit includes:
    a first mirror;
    a first optical port that, during operation, selectively receives first input optical power;
    a first optical waveguide having a first end optically coupled to the first mirror and a second end optically coupled to the first optical port;
    a first optical coupler;
    a first photodetector that, during operation, measures a first optical power;
    a second photodetector that, during operation, measures a second optical power;
    a second optical waveguide optically coupled to the first optical waveguide by the first optical coupler, wherein a first end of the second optical waveguide is optically coupled to the first photodetector and a second end of the second optical waveguide is optically coupled to the second photodetector; and
    control logic electrically coupled to the first photodetector and the second photodetector, wherein, during operation, the control logic determines a reflectivity of the first mirror based on a first ratio of the first optical power and the second optical power when the first input optical power is received on the first optical port.

2. The integrated circuit of claim 1, wherein the first optical port includes a vertical grating coupler.

3. The integrated circuit of claim 1, wherein the integrated circuit comprises:
    a substrate;
    a buried-oxide layer disposed on the substrate; and
    a semiconductor layer disposed on the buried-oxide layer;
    wherein the first optical waveguide, the first optical coupler and the second optical waveguide are, at least in part, included in the semiconductor layer.

4. The integrated circuit of claim 1, wherein the first optical waveguide has a first length equal to L and the second optical waveguide has a second length equal to 2·L.

5. The integrated circuit of claim 1, wherein, during operation, the control logic determines the reflectivity at different wavelengths.

6. The integrated circuit of claim 1, wherein the first mirror includes a distributed Bragg reflector.

7. The integrated circuit of claim 1, wherein the reflectivity test circuit includes:
    a second optical coupler;
    a first optical waveguide termination;
    a second optical waveguide termination; and
    a third optical waveguide optically coupled to the second optical waveguide by the second optical coupler, wherein a first end of the third optical waveguide is optically coupled to the first optical waveguide termination and a second end of the third optical waveguide is optically coupled to the second optical waveguide termination.

8. The integrated circuit of claim 1, wherein the reflectivity test circuit includes:
    a second optical coupler;
    a second mirror;
    a second optical port that, during operation, selectively receives second input optical power;
    a third optical waveguide optically coupled to the second optical waveguide by the second optical coupler, wherein a first end of the third optical waveguide is optically coupled to the second mirror and a second end of the third optical waveguide is optically coupled to the second optical port; and
    wherein during operation, the control logic determines the reflectivity of the first mirror based on a product of the first ratio and a second ratio of the second optical power and the first optical power when the second input optical power is received on the second optical port.

9. The integrated circuit of claim 8, wherein the second optical port includes a vertical grating coupler.

10. The integrated circuit of claim 8, wherein the first optical waveguide has a first length equal to L, the second optical waveguide has a second length equal to 2·L, and the third optical waveguide has a third length equal to L.

11. The integrated circuit of claim 8, wherein, during operation, the control logic determines the reflectivity at different wavelengths.

12. The integrated circuit of claim 8, wherein the first mirror and the second mirror include distributed Bragg reflectors.

* * * * *

UNITED STATES PATENT AND TRADEMARK OFFICE
CERTIFICATE OF CORRECTION

PATENT NO. : 9,841,347 B2  
APPLICATION NO. : 14/947061  
DATED : December 12, 2017  
INVENTOR(S) : Bovington et al.

Page 1 of 1

It is certified that error appears in the above-identified patent and that said Letters Patent is hereby corrected as shown below:

In the Specification

Column 6, Line 38, delete "($P_4''$)," and insert -- ($P_4''$). --, therefor.

Signed and Sealed this
Tenth Day of July, 2018

Andrei Iancu
*Director of the United States Patent and Trademark Office*